(12) United States Patent
Cranga et al.

(10) Patent No.: US 9,592,909 B2
(45) Date of Patent: Mar. 14, 2017

(54) ANTIVIBRATION SUSPENSION DEVICE FOR A MECHANICAL ELEMENT, AND AN AIRCRAFT

(71) Applicant: AIRBUS HELICOPTERS, Marignane (FR)

(72) Inventors: Paul Cranga, Marseilles (FR); Alain Eberhard, Velaux (FR); Jonathan Rodriguez, Martigues (FR); Benoit Rogier, Istres (FR)

(73) Assignee: AIRBUS HELICOPTERS, Marignane (FR)

( * ) Notice: Subject to any disclaimer, the term of this patent is extended or adjusted under 35 U.S.C. 154(b) by 155 days.

(21) Appl. No.: 14/477,003

(22) Filed: Sep. 4, 2014

(65) Prior Publication Data

US 2015/0069173 A1  Mar. 12, 2015

(30) Foreign Application Priority Data

Sep. 6, 2013  (FR) ...................................... 13 02070

(51) Int. Cl.
*F16F 15/02* (2006.01)
*B64C 27/00* (2006.01)

(52) U.S. Cl.
CPC ............ *B64C 27/001* (2013.01); *F16F 15/02* (2013.01); *B64C 2027/002* (2013.01); *B64C 2027/004* (2013.01); *B64C 2027/005* (2013.01)

(58) Field of Classification Search
CPC . F16F 15/00; F16F 15/02; F16F 15/03; B64C 27/001; B64C 2027/002; B64C 2027/004; B64C 2027/005
See application file for complete search history.

(56) References Cited

U.S. PATENT DOCUMENTS 4,140,028 A * 2/1979 Desjardins ............ B64C 27/001
244/17.27
4,311,213 A * 1/1982 Desjardins ............ B64C 27/001
188/380

(Continued)

FOREIGN PATENT DOCUMENTS

EP        0488845      6/1992
FR        2474996      8/1981
(Continued)

OTHER PUBLICATIONS

Korean Notice of Preliminary Rejection Dated Nov. 2, 2015, Application No. 10-2014-0116353, Applicant Airbus Helicopters, 3 Pages.

(Continued)

*Primary Examiner* — Christopher P Ellis
*Assistant Examiner* — Michael Wang
(74) *Attorney, Agent, or Firm* — Brooks Kushman P.C.

(57) ABSTRACT

A suspension device (10) provided with at least one suspension means (20) comprising a flapper (21) performing pendulum motion, the flapper (21) being provided with a mass support (25) supporting at least one flapping mass (30). The mass support (25) is hinged to a carrier structure (2) for isolating and to a holder bar (15) for holding said mechanical assembly. The suspension device (10) includes at least one force generator (70), said suspension device (10) having at least one computer (50) connected to a measurement system (55) measuring the levels of vibration, and to said force generator (70) to regulate said amplitude and said phase actively by controlling the force generator (70) as a function of at least one measurement signal coming from said measurement system (55).

18 Claims, 3 Drawing Sheets

(56) References Cited

U.S. PATENT DOCUMENTS

| | | | | |
|---|---|---|---|---|
| 4,405,101 A | * | 9/1983 | Carlson | B64C 27/001 188/380 |
| 4,458,862 A | * | 7/1984 | Mouille | B64C 27/001 188/379 |
| 4,573,592 A | * | 3/1986 | Oliphant | F16F 9/16 188/380 |
| 4,674,638 A | * | 6/1987 | Oliphant | F16F 9/16 188/380 |
| 5,190,244 A | * | 3/1993 | Yana | B64C 27/001 188/379 |
| 5,219,143 A | | 6/1993 | Staple et al. | |
| 5,813,626 A | * | 9/1998 | Zoppitelli | B64C 27/001 244/17.13 |
| 6,279,704 B1 | * | 8/2001 | Manfredotti | B64C 27/001 188/378 |
| 6,325,327 B1 | * | 12/2001 | Zoppitelli | B64C 27/001 244/17.27 |
| 6,467,723 B1 | * | 10/2002 | Rossetti | B64C 27/001 244/1 N |
| 8,210,951 B2 | * | 7/2012 | Schober | F16F 15/13157 464/68.9 |
| 8,888,037 B2 | | 11/2014 | Pula et al. | |
| 2010/0057260 A1 | * | 3/2010 | Fallahi | F16F 7/1005 700/280 |
| 2011/0027081 A1 | | 2/2011 | Jolly et al. | |
| 2011/0268573 A1 | * | 11/2011 | Girard | B64C 27/001 416/145 |
| 2012/0292434 A1 | | 11/2012 | Welsh | |
| 2013/0119192 A1 | * | 5/2013 | Pula | B64D 27/26 244/54 |
| 2013/0233998 A1 | * | 9/2013 | Bueter | F16F 7/1005 248/566 |

FOREIGN PATENT DOCUMENTS

| | | |
|---|---|---|
| FR | 2747098 | 10/1997 |
| FR | 2784350 | 4/2000 |
| FR | 2795386 | 12/2000 |
| FR | 2982583 | 5/2013 |
| JP | S5453498 A | 4/1979 |
| KR | 20130054147 A | 5/2013 |

OTHER PUBLICATIONS

French Search Report for FR 1302070, Completed by the French Patent Office on May 9, 2014, 6 Pages.

\* cited by examiner

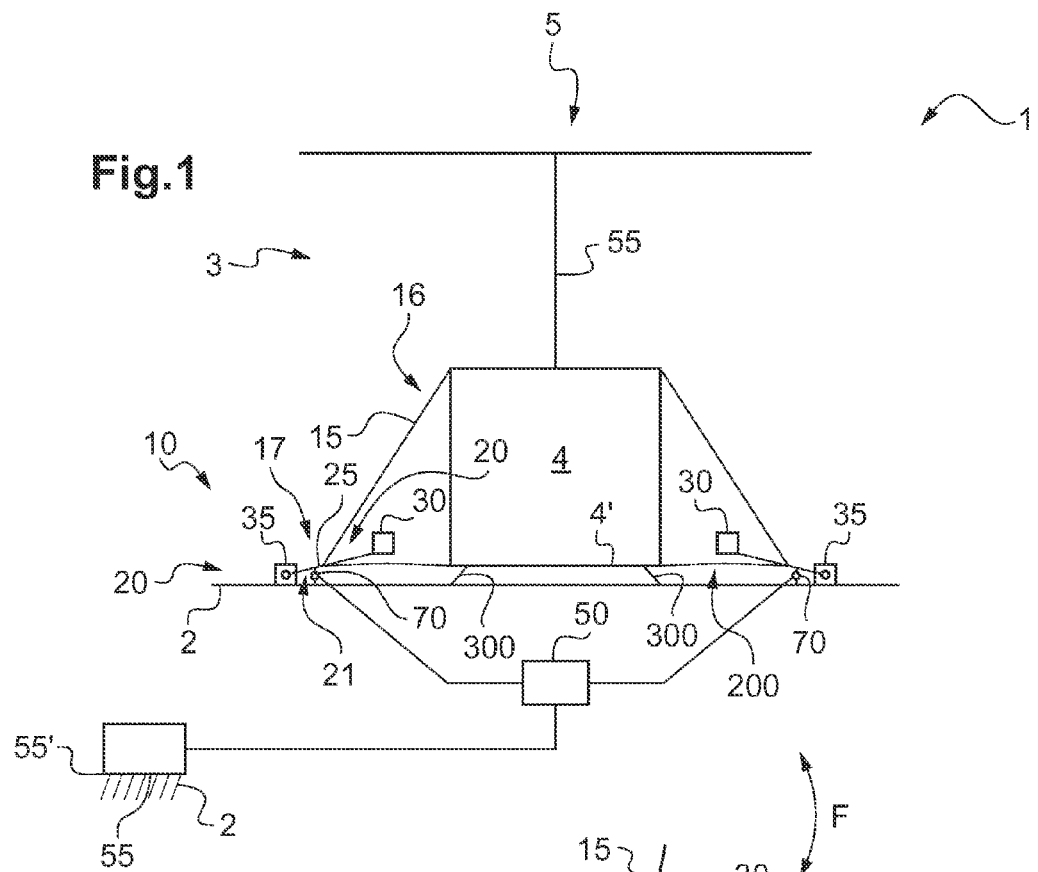
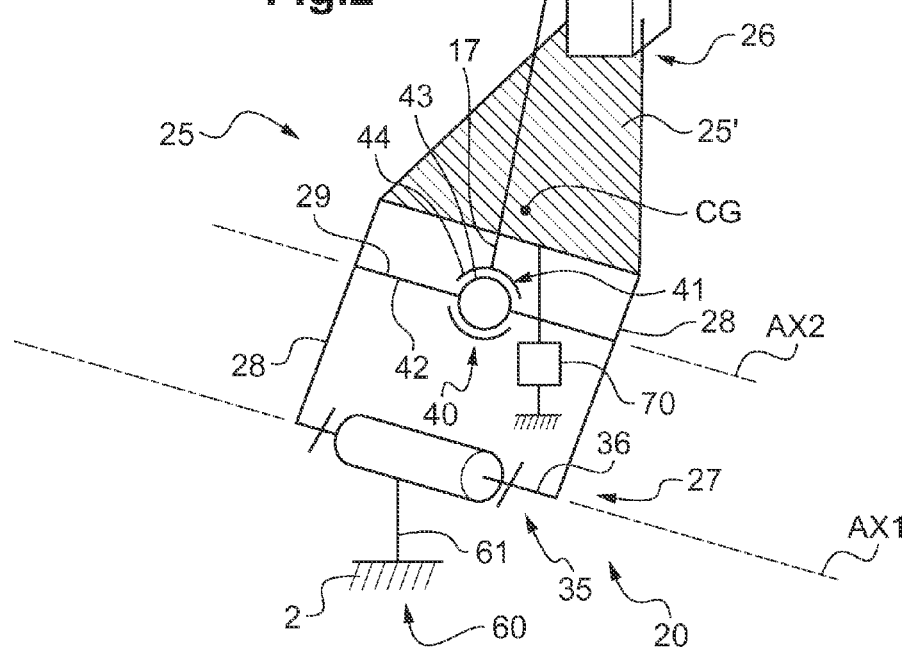

ANTIVIBRATION SUSPENSION DEVICE FOR A MECHANICAL ELEMENT, AND AN AIRCRAFT

CROSS REFERENCE TO RELATED APPLICATION

This application claims priority to French patent application No. FR 13 02070 filed on Sep. 6, 2013, the disclosure of which is incorporated in its entirety by reference herein.

BACKGROUND OF THE INVENTION (1) Field of the Invention

The present invention relates to an antivibration suspension device for a mechanical element, and to an aircraft having such a device.

The invention thus lies in the narrow technical field of devices for reducing vibration on board aircraft.

(2) Description of Related Art

Aircraft include in particular rotorcraft that have at least one lift rotor that is connected to a carrier structure, which carrier structure is commonly referred to as an "airframe" or as a "fuselage".

Such an aircraft also includes a power plant driving a main gearbox (MGB) secured to the carrier structure of the aircraft. The main gearbox then includes a mast for driving the lift rotor in rotation.

It should be observed that the main gearbox is often connected to the carrier structure via a bottom wall and auxiliary fastener means generally comprising three or four sloping holder bars. The structure for mounting the lift rotor and including the main gearbox and the holder bars is sometimes referred to as a "pylon" by the person skilled in the art, given its shape.

The lift rotor and the main gearbox form a mechanical assembly that can give rise to vibration liable to lead to discomfort for the occupants of the aircraft, by generating vibratory motion and noise. Furthermore, such vibration puts constraints on the equipment of the aircraft that is located in the carrier structure.

In order to provide a good level of comfort in the aircraft, it is advantageous to incorporate an antivibration system as close as possible to the source of the dynamic forces that give rise to the vibration. Installing an antivibration system between the mechanical assembly and the carrier structure is advantageous. Installing the system in that way enables all of the torsor components exciting the lift rotor to be processed without presenting the complexity and the constraints involved with incorporating the system in the rotary portion of the lift rotor, given that it is the rotor that is the main generator of vibration.

Under such circumstances, various main gearbox suspension devices are known for the purpose of at least reducing vibration within the aircraft, and in particular within a cabin for the comfort of pilots and of passengers.

Such a suspension device must be capable firstly of transmitting the static loads transmitted by the mechanical assembly, and secondly of filtering the vibration that is induced by the rotor. It is observed that this vibration is produced at very low frequency and is therefore uncomfortable for the occupants of the aircraft.

Furthermore, it can be understood that a manufacturer seeks to obtain a suspension device that is of minimum impact in terms of weight and cost.

It should also be observed that certain aircraft have a suspension rotor that may rotate in flight at various speeds of rotation. It is then advantageous to obtain a suspension device that matches that type of technology.

In the state of the art, there is Document FR 2 474 996, which discloses a suspension system for a mechanical assembly of a helicopter.

That suspension system has four sloping holder bars and a suspension plate for a main gearbox. The suspension plate has a central portion secured to a bottom of the main gearbox and one arm per sloping holder bar. Each arm is hinged in the region of its proximal end firstly to the fuselage and secondly to an extreme zone of the corresponding holder bar. The distal end of each bar also carries a flapping mass ("masse battante" in French language) that stresses the arm in bending.

That suspension system is very effective, but its adjustment depends on the relative proportions between the components of the force torsor acting on the rotor head, such that it is not optimally adjusted over the entire flight spectrum of the aircraft. In addition, the behaviors of the flapping masses are mutually coupled, which means that a search for optimum adjustment is lengthy and iterative.

Also known are Documents U.S. Pat. Nos. 4,311,213 and 4,405,101.

According to Document FR 2 747 098, a suspension system has flapping masses and means for moving those flapping masses in a longitudinal direction along a support. Under such circumstances, the device has at least one sensor suitable for measuring the values of at least one parameter representative of a performance criterion of the device and a computer receiving said values in order to further control the positions of the flapping masses via their respective movement means.

That device can therefore combat vibration being produced at varying frequencies. Nevertheless, the system behaves as a passive system, of adjustment that can be adapted under quasi-steady conditions.

Document FR 2 982 583 describes an antivibration suspension system having at least one holder bar hinged via a bottom end to a lever of a suspension means. The lever extends from a distal end supporting at least one flapping mass to a proximal end hinged to a carrier structure. The suspension system includes torsion return means provided with a rotary actuator for matching the stiffness in torsion of the lever to flight conditions.

Document U.S. Pat. No. 5,219,143 discloses a system having actuators within holder bars of a main gearbox. A computer issues orders to the actuators on the basis of measured forces or accelerations. The dynamic forces that need to be generated are high, and involve the use of actuators that are heavy and expensive, and possibly difficult to maintain.

Document U.S. Pat. No. 6,467,723 describes a vibration control system having actuators arranged in housings formed in the fuselage. The drawback of that type of system is that vibration is processed locally and generally along a single axis (vertical or lateral).

Document US 2012/0292434 describes a system for actively controlling vibration, which system is implemented on the hub of a rotor. It enables all of the components of the torsor to be processed, and its drawback lies in the complexity of being installed on the hub.

Document FR 2 784 350 describes a system that is remote from the field of the invention for the purpose of reducing the vibration caused by the flow of air passing through a rotor and impacting against a structure. The processing is generally local and along only one direction.

Document US 2013/0233998 proposes a system having an actuator for adjusting an antiresonance frequency. The actuator generates a static force to move a mass for that purpose.

Also known are Documents US 2011/027081, FR 2 795 386, and EP 0 488 845.

BRIEF SUMMARY OF THE INVENTION

An object of the present invention is thus to propose a suspension device for a mechanical assembly of an aircraft having a main gearbox and a lift rotor, the suspension device remaining effective for various flight conditions and configurations of the aircraft so as to minimize troublesome vibration, in particular as perceived by the pilots and passengers.

According to the invention, an antivibratory suspension device for a mechanical assembly is provided with at least one suspension means, the suspension means including a flapper—said flapper being named "batteur" in the French language-performing pendulum motion, the flapper being provided with a mass support that extends from a distal end supporting at least one flapping mass to a proximal end, the proximal end being provided with a first hinge for hinging the mass support to a carrier structure for isolating, the suspension means having a second hinge for hinging a holder bar of the mechanical assembly to the mass support between the distal end and the proximal end.

Furthermore, the suspension device includes at least one force generator acting on the amplitude and the phase of the pendulum motion of the flapper, the suspension device having at least one computer connected to the force generator and to a measurement system measuring a vibratory response of the carrier structure to adjust the amplitude and the phase actively by controlling the force generator as a function of at least one measurement signal coming from the measurement system.

Each suspension means then includes a flapper hinged to a holder bar of a mechanical assembly and to a carrier structure. The suspension device is also an active antivibratory system adjusting the amplitude and the phase of the motion of the pendulum movement of the flapper as a function of information measured by the measurement system. In the context of an aircraft, said suspension device then operates at an optimum adjustment point regardless of the flight configuration and of the load of the aircraft, unlike a passive system.

The suspension device incorporates an active force generator in suspension means having a flapper by making use of a measurement of the vibration of the carrier structure. The active force generator generates a dynamic force that serves to counter the forces exciting the carrier structure.

To this end, the computer may comprise a logic circuit, a microcontroller, a microprocessor, or indeed at least one processor, for example, executing stored instructions of a control algorithm for controlling the force generator. Any unit suitable for generating an order as a function of input data can thus be implemented.

The measurement system for measuring vibratory levels may be provided with at least one accelerometer or with at least one force-measurement sensor arranged on the carrier structure. As a function of the measurements taken, the computer modifies the amplitude and the phase of the movement of the flapper in application of the control algorithm.

The force generator may be of hydraulic, pneumatic, electromechanical, electromagnetic, or indeed piezoelectric type, for example. The force generator may be of small dimensions, since the dynamic force required for controlling the flapper is moderate due to the kinematic amplification of the flapper.

Thus, the force generator enables the phase and the amplitude of the forces generated by the flapper to be adapted continuously in order at least to minimize the vibration generated by the mechanical assembly on the carrier structure. This minimizing of vibration can be obtained regardless of the excitation frequency of the carrier structure and regardless of the distribution of forces between a plurality of holder bars, where applicable. The computer controls the force generator as a function of information coming from the measurement system.

The control generated by the computer is a function of information delivered by at least one accelerometer and/or at least one force cell arranged on the carrier structure, for example.

This device makes it possible to "personalize" the processing of the vibration in a preferred zone. For example, the measurement system may have a sensor arranged in a cabin so that the computer controls the force generator in order to minimize the vibration perceived in the cabin.

Unlike passive suspension means having a blade, the invention tends to minimize vibration continuously, and not by means of a given configuration corresponding to the setting of the suspension means.

The invention thus also makes it possible to attenuate vibration over a broad range of frequencies. The invention thus possesses a non-negligible advantage in an aircraft having a rotary wing that may rotate at a plurality of different speeds, thereby generating vibration in distinct frequency bands.

Furthermore, coupling, if any, between the flappers of a plurality of suspension means can be taken into account directly by the computer.

Compared with an active control system arranged in a cabin of an aircraft having a lift rotor, the invention proposes active suspension means capable of being incorporated between a main gearbox driving the lift rotor and a carrier structure of the aircraft. The suspension means are thus arranged on the direct path of the dynamic forces transmitted by the rotary assembly to the carrier structure.

This arrangement enables all of the components of the excitation torsor at the head of the lift rotor to be controlled, whereas an active system in the cabin filters vibration in one direction only.

Furthermore, this arrangement makes it possible to reduce vibration over the entire carrier structure, whereas with an active system in the cabin it can happen that there exist zones where vibration is decreased together with other zones where vibration is increased.

The suspension device may include one or more of the following characteristics.

Thus, said suspension device includes one resilient element per flapper in order to provide stiffness between the mechanical assembly and the carrier structure.

The resilient element provides the stiffness needed for transmitting static loads, and it is arranged in parallel with the suspension device.

In an embodiment, the mechanical element may also comprise a plurality of holder bars. Each holder bar may then be hinged to its own suspension means.

Furthermore, the suspension device may then include one force generator for each suspension means.

Likewise, the suspension device may include one computer per force generator, or indeed one computer connected to all of the force generators.

Furthermore, the suspension device may include fastener means for fastening at least one force generator to the carrier structure.

The suspension device may include a fastener system for fastening at least one force generator to the mechanical assembly.

The suspension device may include a fastener member for fastening at least one force generator to said flapper.

Thus, in a variant, a force generator may for example:

be interposed between the carrier structure and the flapper;

be interposed between the carrier structure and the mechanical assembly; or be interposed between the flapper and the mechanical assembly.

In a version, the force generator is for example an electromagnetic actuator comprising a magnetic mass, at least one coil, and an electrical power amplifier connected to each coil and to the computer.

Two sets of coils may be provided to cover antivibration action, e.g. over two distinct frequency ranges.

For example, each coil may be fastened to a flapping mass in such a manner as to have the magnetic mass pass therethrough. The magnetic mass may be fastened to the mechanical assembly. The coil is powered electrically by the power amplifier, being controlled by the computer, which prepares a command order as a function of information coming from the measurement system.

Such a force generator presents the advantage of presenting relatively little mass and of minimizing the forces that need to be delivered in order to act on the flapper.

Furthermore, the measurement system may include attachment means for attaching to a carrier structure. The measurement system may be attached in predetermined zones in order to minimize vibration in those zones in particular.

In a version, the force generator is connected to the flapping mass, e.g. in order to present at least a portion of the flapping mass, thereby serving in particular to simplify the device. Furthermore, this arrangement makes it possible to minimize the forces to be delivered for the purpose of modifying the amplitude and/or the phase of the motion of the flapper by maximizing the distance between the force generator and the proximal end of the flapper.

In an embodiment, the force generator includes at least one coil secured to the flapping mass and a magnetic mass, the magnetic mass being connected to the flapping mass by a resilient body.

In another embodiment, the force generator comprises a piezoelectric member incorporated in the flapping mass support and connected to the flapping mass.

In another embodiment, the force generator includes at least one pair of contrarotating masses carried by the flapping mass. The frequency of rotation of the contrarotating masses determines the frequency of the dynamic force generated by the flapper, with the angular position of the contrarotating masses relative to each other determining the amplitude and the phase of this dynamic force.

The invention also provides an aircraft having a carrier structure and a mechanical assembly including a lift rotor and a main gearbox driving the lift rotor, the mechanical assembly including at least one holder bar extending from a top end hinged to the main gearbox to a bottom end.

This aircraft includes a suspension device of the above-described type, at least one bottom end of a holder bar being hinged to a second hinge of a suspension means of the suspension device.

Each holder bar is optionally hinged to a suspension means of the invention.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a diagrammatic view of an aircraft of the invention;

FIG. 2 is a diagrammatic view of a suspension device; and

Figure 3:
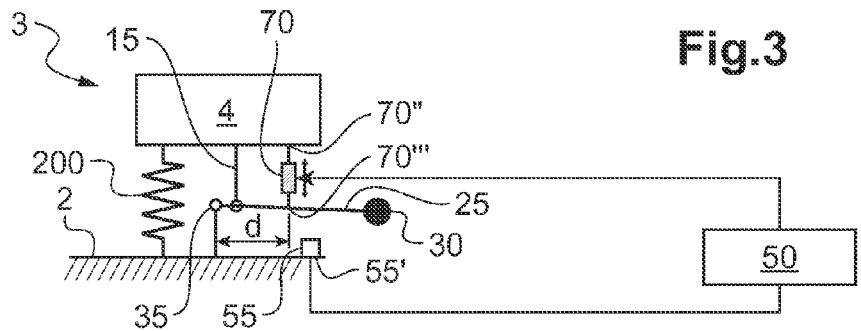
FIGS. 3 to 9 are diagrammatic views of embodiments of a suspension device of the invention.

Elements present in more than one of the figures are given the same references in each of them.

DETAILED DESCRIPTION OF THE INVENTION

FIG. 1 shows an aircraft 1 including a carrier structure 2. The aircraft 1 also has a mechanical assembly 3 fastened to the carrier structure 2 in order to contribute in particular to providing the aircraft 1 with lift.

The mechanical assembly 3 includes a lift rotor 5, a main gearbox (MGB) 4 of the mechanical assembly 3 being interposed between the lift rotor 5 and a power plant that is not shown in the figures.

The aircraft is shown in deliberately incomplete manner in the figures in order to avoid overloading the figures.

The main gearbox 4 rests on the carrier structure 2 via a diaphragm 300 that takes up torque and enables the transmission to move.

The aircraft 1 has a suspension device serving firstly to reduce the amount of vibration that is transmitted by the mechanical assembly 3, and secondly to fasten the mechanical assembly 3 to the carrier structure.

The mechanical assembly 3 includes at least one holder bar 15, and indeed at least three holder bars 15 for fastening it to the carrier structure. Each holder bar extends from a top end 16 to a bottom end 17. Each top end 16 is hinged to the main gearbox 4 and in particular to a top portion of the main gearbox 4, while each bottom end 17 is connected indirectly to the carrier structure 2.

Under such circumstances, the suspension device comprises at least one suspension means 20 interfaced between a holder bar 15 and the carrier structure 2. For example the suspension device comprises one suspension means per holder bar hinged to the carrier structure and to the bottom end 17 of the corresponding holder bar.

Each suspension means 20 includes a flapper 21 having support means 25 supporting a flapping mass 30 (or "fly weight", or "masse battante" in French language) and the bottom end 17 of a suspension bar. The support means 25 may be a lever or a blade.

FIG. 2 shows a suspension means 20 of the invention in detail.

The support means 25 may comprise a flat zone 25' extended by two longitudinal arms 28 that are connected together by a transverse arm 29 so as to present an H-shape. The flapper then extends longitudinally from a "proximal" end 27 to a "distal" end 26.

The flapping mass is then carried by the distal end 26 of the flapper.

Furthermore, the proximal end 27 is provided with a first hinge 35 enabling the support means 25 to be hinged to the carrier structure 2.

The first hinge 35 may optionally include a pivot connection enabling the support means and thus the flapping mass 30 to pivot about a first direction AX1.

Consequently, the first hinge may comprise a fitting 60 suitable for being fastened to the carrier structure 2. A first pivot axis 36 of the first hinge may then pass through at least one cheekplate 61 of the fitting 60.

In addition, the suspension means includes a second hinge 40 for hinging a holder bar 15 to the support means 25 close to the first hinge. For example, the second hinge 40 is arranged in a zone lying between the center of gravity Cg of the flapper and the first hinge 35.

This second hinge 40 may include at least one pivot connection. The second hinge may advantageously be a ball joint having a second connection axis 42 represented by the transverse arm 29. The second connection axis 42 passes through a spherical internal portion 43 of a ball joint, this spherical internal portion 43 being arranged in a cage 44 of the bottom portion 17 of the holder bar 15.

The second connection axis 42 extends along a second direction AX2 parallel to the first axis AX1.

The second hinge 40 is offset relative to the first hinge 35, thus kinematically amplifying the movement of the flapping mass 30 that is caused by the relative movement between the carrier structure 2 and the main gearbox 4.

The suspension device also includes one resilient element 200 per suspension means, which element serves to provide the stiffness necessary for taking up the static forces that pass via the holder arms 15. The resilient element 200 is constituted in FIG. 1 by a blade working in bending that is secured to the arms 28 of the flapper and that rests at its end on the bottom 4' of the main gearbox. In other variants, the resilient element 200 may be constituted by a torsion tube mounted at the first hinge 35 between the fitting 60 and the flapper 21, or indeed by a spring arranged between a flapper 21 and the carrier structure, for example.

Furthermore, the suspension device may include at least one force generator 70 for controlling the amplitude and the phase of the oscillating motion of a flapper 21.

With reference to FIG. 1, the suspension device 10 may have a force generator 70 incorporated in each suspension means. The force generator is an actuator that may be hydraulic, pneumatic, electromechanical, electromagnetic, or indeed piezoelectric.

The suspension device 10 also has at least one computer 50 connected to a measurement system 55 measuring the vibratory response of the carrier structure by means of accelerometers or force sensors. For example, accelerometers are adhesively bonded to the carrier structure 2.

Each force generator 70 then communicates with a computer 50, the computer 50 actively controlling the amplitude and the phase of the motion of the flapper by issuing orders to the force generator 70 as a function of at least one measurement signal coming from the measurement system 55.

The suspension device may include a respective computer for each force generator 70, or indeed a single computer 50 controlling all of the force generators 70 of the suspension device 10.

With reference to FIGS. 3 to 9, the suspension device may comprise: fastener means 70' for fastening at least one force generator 70 to the carrier structure 2; a fastener system 70" for fastening at least one force generator 70 to the mechanical assembly 3; and a fastener member 70''' for fastening at least one force generator 70 to the flapper.

Thus, as shown in FIG. 3, the force generator 70 may be interposed between the flapper and the mechanical assembly 3 by being attached to each of them by conventional means.

In this configuration, the distance d between the first hinge 35 and the attachment point of the force generator 70 to the mass support 25 is advantageously maximized in order to reduce the forces that need to be delivered.

Figure 4:
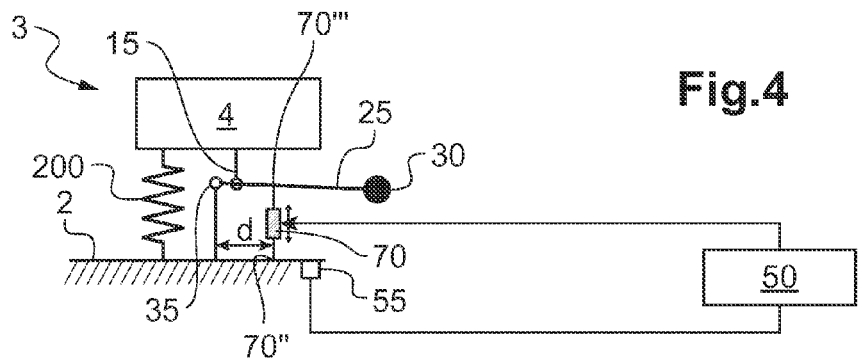

As shown in FIG. 4, the force generator 70 may be interposed between the flapper and the carrier structure 2 by being attached to each of them by conventional means.

Figure 5:
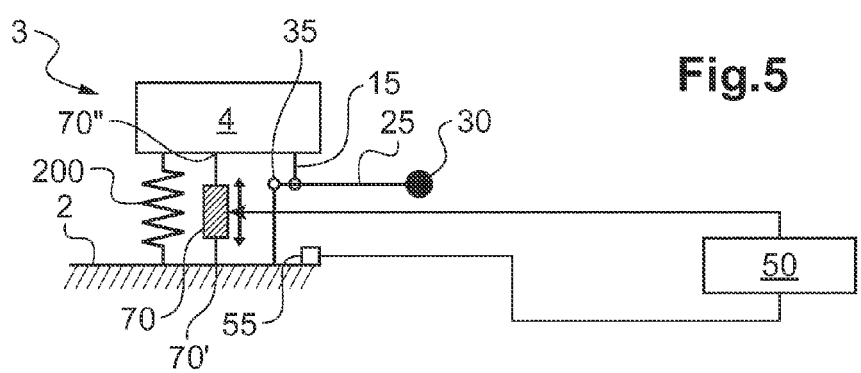

As shown in FIG. 5, the force generator 70 may be interposed between the mechanical assembly 3 and the carrier structure 2 by being attached to each of them by conventional means.

As shown in FIGS. 6 to 9, the force generator 70 is connected to the distal end 26 of the flapper, and thus to the flapping mass.

Figure 6:
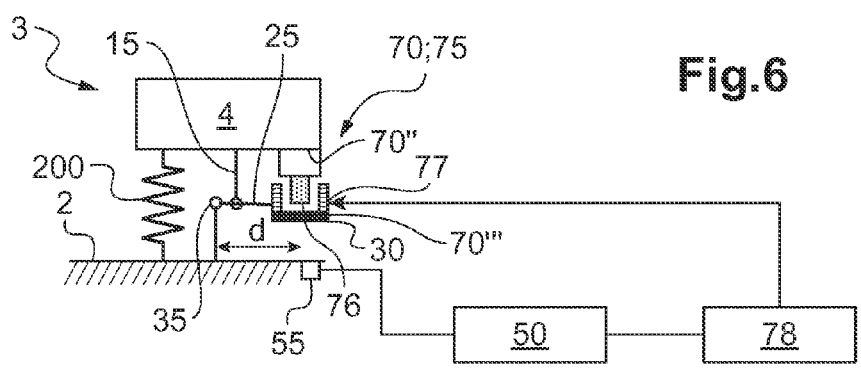

In FIG. 6, the force generator 70 is interposed between the mechanical assembly 3 and the flapping mass.

For example, the force generator 70 includes an electromagnetic actuator 75 that comprises a magnetic mass 76 fastened to the main gearbox 4. In addition, the electromagnetic actuator 75 has at least one coil 77 fastened to the flapping mass 30, and possibly an electrical power amplifier 78 connected to said coil 77 and to said computer 50. The coil 77 and the flapping mass may constitute a single physical entity.

Figure 7:
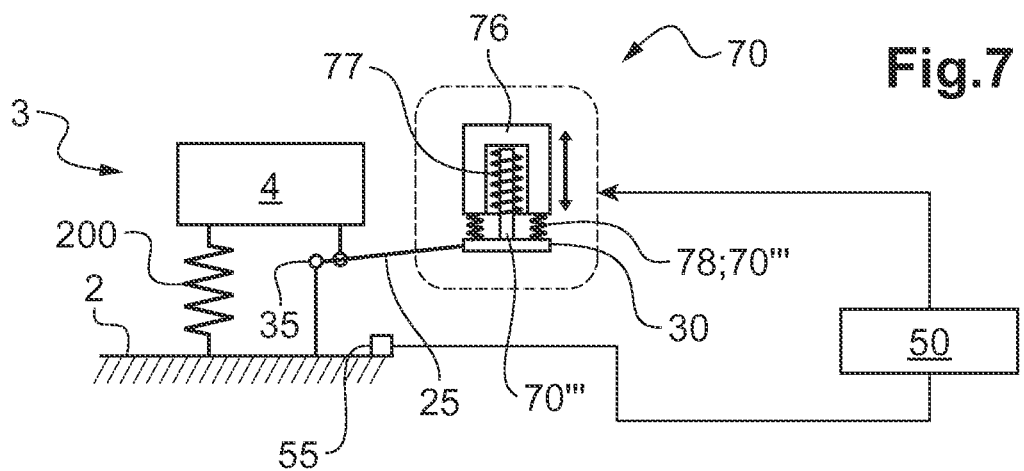
Figure 8:
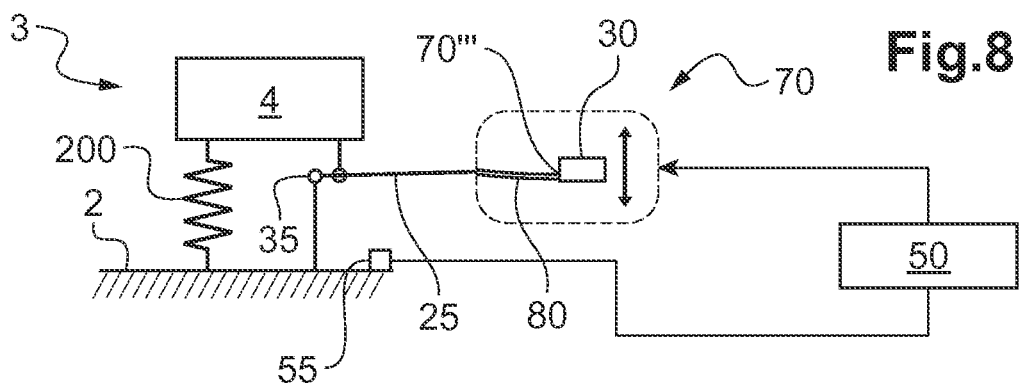
Figure 9:
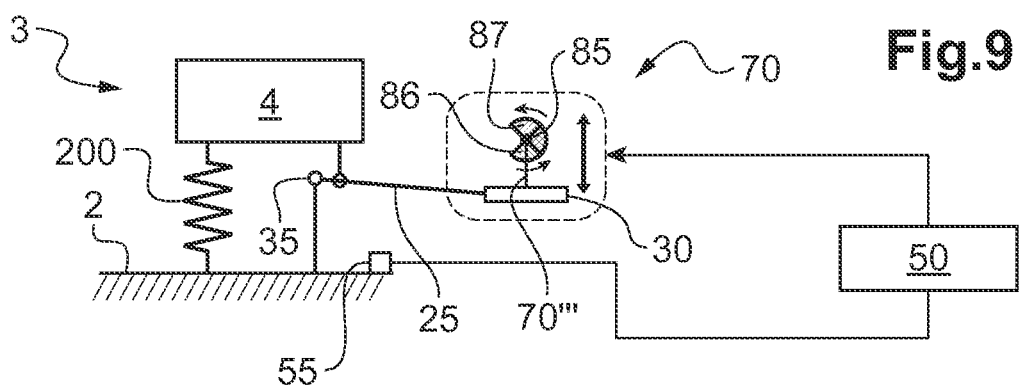

As shown in FIGS. 7 to 9, the force generator is merely attached to the distal end of the suspension means.

FIG. 7 shows a force generator provided with at least one coil 77 secured to the flapping mass 30. In addition, the force generator has a magnetic mass 76 resiliently attached to the flapping mass 30 by a resilient body 78, such as a spring. The magnetic mass is then movable relative to the flapping mass. Each coil may extend in a housing in the magnetic mass.

Each coil 77 then communicates with a computer 50 optionally via a power amplifier.

FIG. 8 shows a force generator that is provided with a piezoelectric member 80. This electromagnetic actuator 75 is incorporated in the mass support 25 and carries the flapping mass 30.

FIG. 9 shows a force generator having two contrarotating masses 86 and 87 carried by the flapping mass 30. At least one motor 85 causes the contrarotating masses to rotate. A motor can thus adjust the angular phase offsets between the contrarotating masses.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An antivibratory suspension device for a mechanical assembly, the device comprising:
    a flapper performing pendulum motion, the flapper being provided with a mass support that extends from a distal end supporting at least one flapping mass to a proximal end, the proximal end being provided with a first hinge for hinging the mass support to a carrier structure for isolating;

a second hinge for hinging a holder bar of the mechanical assembly to the mass support between the distal end and the proximal end;

at least one dynamic force generator acting on an amplitude and phase of the pendulum motion of a flapper;

a measurement system measuring a vibratory response of the carrier structure; and a computer in communication with the measurement system and the dynamic force generator, wherein the computer controls the dynamic force generator to adjust the amplitude and the phase of the flapper as a function of at least one measurement signal coming from the measurement system, wherein the at least one dynamic force generator includes at least one coil secured to the flapping mass and a magnetic mass, the magnetic mass being directly attached to the flapping mass by a resilient body.

2. The device according to claim 1, further comprising fastener means for fastening the at least one force generator to the carrier structure.

3. The device according to claim 1, further comprising a fastener system for fastening at least one force generator to the mechanical assembly.

4. The device according to claim 1, further comprising a fastener member for fastening at least one dynamic force generator to the flapper.

5. The device according to claim 1, wherein the at least one dynamic force generator is an electromagnetic actuator comprising a magnetic mass, at least one coil, and an electrical power amplifier connected to the coil and to the computer.

6. The device according to claim 5, wherein the coil is arranged on the flapping mass.

7. The device according to claim 1, wherein the measurement system includes attachment means for attachment to the carrier structure.

8. The device according to claim 1, wherein the at least one dynamic force generator is connected to the flapping mass.

9. The device according to claim 1, wherein the at least one dynamic force generator includes a piezoelectric member incorporated in the mass support.

10. The device according to claim 1, wherein the at least one dynamic force generator includes at least one pair of contra-rotating masses carried by the flapping mass.

11. The device according to claim 1, further comprising a resilient element connected to the flapper in order to provide stiffness between the mechanical assembly and the carrier structure.

12. The device according to claim 1, further comprising at least two flappers, wherein one force generator is provided for each flapper.

13. The device according to claim 12 further comprising one computer for each force generator.

14. An aircraft having a carrier structure and a mechanical assembly including a lift rotor and a main gearbox driving the lift rotor, the mechanical assembly including at least one holder bar extending from a top end hinged to the main gearbox to a bottom end, wherein the aircraft includes a suspension device according to claim 1, at least one bottom end of a holder bar being hinged to the second hinge of a suspension means of the suspension device.

15. The aircraft according to claim 14, wherein each holder bar is hinged to a flapper.

16. An aircraft comprising:

a carrier structure;

a mechanical assembly including a lift rotor and a main gearbox driving the lift rotor, the at least one holder bar extending from a top end hinged to the main gearbox to a bottom end;

an antivibratory suspension device for the mechanical assembly, the antivibratory suspension device including:

a flapper performing pendulum motion, the flapper being provided with a mass support that extends from a distal end supporting at least one flapping mass to a proximal end, the proximal end being provided with a first hinge for hinging the mass support to a carrier structure for isolating;

a second hinge for hinging a holder bar of the mechanical assembly to the mass support between the distal end and the proximal end;

at least one dynamic force generator acting on an amplitude and phase of the pendulum motion of a flapper;

at least one computer connected to the at least one dynamic force generator and to a measurement system measuring a vibratory response of the carrier structure to adjust the amplitude and the phase actively by controlling the at least one dynamic force generator as a function of at least one measurement signal coming from the measurement system, wherein the at least one dynamic force generator includes at least one coil secured to the flapping mass and a magnetic mass, the magnetic mass being directly attached to the flapping mass by a resilient body, with at least one bottom end of the holder bar being hinged to the second hinge of a suspension means of the suspension device.

17. An aircraft comprising:

a carrier structure;

a mechanical assembly including a lift rotor and a main gearbox driving the lift rotor;

a holder bar hinged at a top end to the main gearbox and extending to a bottom end;

an antivibratory suspension device for the mechanical assembly, the antivibratory suspension device including:

a flapper hinged to the carrier structure at a proximal end to act in pendulum motion, the flapper having at least one flapping mass supported on a distal end;

a second hinge for hinging the at least one holder bar to the flapper;

a dynamic force generator acting on an amplitude and phase of the pendulum motion of a flapper;

a measurement system measuring a vibratory response of the carrier structure;

a computer in communication with the measurement system and the dynamic force generator, wherein the computer controls the dynamic force generator to adjust the amplitude and the phase of the flapper based on the measured vibratory response of the carrier structure, wherein the dynamic force generator includes at least one coil secured to the flapping mass and a magnetic mass, the magnetic mass being directly attached to the flapping mass by a resilient body.

18. The aircraft according to claim 17, wherein a center of mass of the flapper is located between the second hinge and the distal end.

* * * * *